Dec. 19, 1950  C. M. EASON  2,534,426
CENTRIFUGAL CLUTCH

Filed March 5, 1947  5 Sheets-Sheet 1

INVENTOR.
Clarence M. Eason,
BY Brown, Jackson
Boettcher & Dienner
ATTYS

Dec. 19, 1950 C. M. EASON 2,534,426
CENTRIFUGAL CLUTCH
Filed March 5, 1947 5 Sheets-Sheet 2

INVENTOR.
Clarence M. Eason,
BY Brown, Jackson,
Boettcher & Dienner
Attys.

Dec. 19, 1950      C. M. EASON      2,534,426
CENTRIFUGAL CLUTCH Filed March 5, 1947      5 Sheets-Sheet 5

INVENTOR.
Clarence M. Eason,
BY Brown, Jackson,
Boettcher & Dienner

UNITED STATES PATENT OFFICE 2,534,426

CENTRIFUGAL CLUTCH

Clarence M. Eason, Waukesha, Wis., assignor to Industrial Clutch Corporation, Waukesha, Wis., a corporation of Wisconsin Application March 5, 1947, Serial No. 732,414

9 Claims. (Cl. 192—105)

The present invention relates to centrifugal clutches wherein centrifugal force is utilized to automatically control engagement of driving and driven clutch members.

One of the principal objects of the invention is to provide an improved centrifugal clutch which is capable of transmitting a large starting torque to the load without objectionable overheating or wear of the clutch. More specifically in this regard, the present clutch has particular application to power driving situations where the load to be driven has a relatively high starting torque, typically represented by air compressors and the like.

Another more particular object of the invention is to provide an improved centrifugal clutch in which there is a very substantial differential between the rotative speed at which clutch engagement occurs and the rotative speed at which clutch release occurs. For example, in the preferred embodiment of my invention actual clutch engagement will not start until the rotative speed of the driving element has been brought up to a clutching speed which closely approaches the normal running speed of the device, and, conversely, actual clutch release will not start until the rotative speed has come down to a releasing speed which is approximately half that of clutching speed, or even less. Thus, assuming a gasoline engine or other like prime mover arranged to drive an air compressor at approximately 1800 revolutions per minute, my improved centrifugal clutch will not initiate actual clutching engagement until the engine speed is up in the neighborhood of 1200 R. P. M., whereupon the clutch will automatically engage and will maintain driving engagement until the rotative speed of the unit has come down to approximately 500 R. P. M. to 600 R. P. M., or even less. This enables a large amount of kinetic energy to be stored up in the prime mover, as for example in the fly-wheel of a gasoline engine, before clutching engagement is even started. Hence, a load having a high starting torque can be successfully driven by my improved automatic centrifugal clutch. If the high starting torque of the load should momentarily bring the speed of the prime mover down considerably below the clutching speed at which clutch engagement occurs this will not release the clutch, but the clutch will maintain engagement until the speed of the prime mover has been brought down to approximately one-half of normal running speed or clutching speed, which would not ordinarily occur unless the prime mover is being abnormally overloaded, or the prime mover speed is being purposely reduced for releasing the clutch.

Another object of the invention is to provide an improved centrifugal clutch in which the act of automatically engaging the clutch and the act of automatically releasing the clutch are both relatively rapid operations so that there is no considerable interval of slipping or part-way engagement, which is very likely to overheat or burn up a heavily loaded clutch.

Another object of the invention is to provide improved centrifugal mechanism utilizing pivoted centrifugal weights acting in opposition to resisting or retracting springs, wherein an inverse relationship exists between centrifugal weight action and retracting spring action. That is to say, when the effectiveness of the pivoted centrifugal weights increases with rising speed and change of pivotal position of the weights, then the effectiveness of the retracting springs decreases; and, conversely, when the effectiveness of the pivoted centrifugal weights decreases with falling speed and change of pivotal position, then the effectiveness of the retracting springs increases. In the preferred embodiment of the invention, this is accomplished by having each pivoted centrifugal weight transmit its clutch engaging force through a variable radius arm which increases in effective length as the pivoted weight swings outwardly in response to increasing centrifugal force, and which radius arm decreases in effective length as the pivoted weight swings inwardly in response to spring retraction. As the inverse counterpart of this, the retracting spring acts through a variable radius arm which decreases in effective length as the pivoted weight swings outwardly under centrifugal force, and which increases in effective length as the pivoted weight swings inwardly in response to this spring retraction.

Another object of the invention is to provide an improved centrifugal clutch in which the centrifugal forces set up in the major parts of the clutch act cumulatively for producing clutch engagement. For example, the driving clutch elements consist of pivoted clutch shoes in which centrifugal force tends to produce clutch engagement, thereby augmenting the action of the pivoted centrifugal weights, with the result that these weights need not be as large as they would have to be if the driving clutch elements did not have a centrifugal engaging action.

Another object of the invention is to provide an improved construction of centrifugal clutch embodying a simplified and readily actuatable form of adjusting mechanism for adjusting the clutch to compensate for wear of the friction surfaces or other wear of the parts.

Another object of the invention is to provide a shoe type of clutch in which the clutch shoes have a free floating mounting on the driving member of the clutch. This free floating mounting enables the clutch shoes to automatically center themselves with respect to the driven clutch surface as they are forced into clutching engagement with said driven clutch surface. This free floating mounting enables the automatic centering to occur with respect to angular misalignment, or offset misalignment, or both. Thus, if there is angular misalignment, or offset misalignment, or both, between the driving and driven members of the clutch, the free floating mounting enables the clutch shoes to center themselves accurately within the driven clutch element, and to rotate in exact concentricity with this driven clutch element, even though they are receiving their entire torque load or driving force from a driving clutch member which is out of alignment with respect to the orbit in which the clutch shoes are now rotating. One of the more specific objects of this free floating mounting is to provide a construction in which the torque is transmitted from the driving member of the clutch to the driving shoes through a floating torque transmitting connection. Another more specific object of the free floating mounting is to provide a construction in which the reaction pressure of the clutching engagement is transmitted from shoe to shoe, instead of to a spider or other supporting structure. The shoe assembly then virtually becomes a self-contained independent unit.

Another object of the invention is to provide an automatic centrifugal clutch having the features first described, and also characterized by the free floating mounting last described. In this regard, the pivoted centrifugal weights, the retracting springs, and the adjusting mechanism all have free floating mounting with respect to the driving clutch member.

Other objects, features and advantages of the invention will appear from the following detail description of one preferred embodiment of the invention. In the accompanying drawings illustrating such embodiment.

Referring to the preferred embodiment of the invention, illustrated in Figures 1 to 6, inclusive, all of the operating parts of this embodiment are carried by a rotary mounting ring 20 which is adapted to have bolted attachment to a suitable prime-mover conventionally indicated at 21. In the typical case of an internal combustion engine arranged to drive an air compressor, the prime-mover 21 would be the fly wheel of the internal combustion engine, this fly wheel supplying a large amount of kinetic energy at the time of clutch engagement for starting a load having a high starting torque, such as a conventional air compressor. The driven member through which the centrifugal clutch transmits the engine torque to the compressor is preferably in the form of a clutch drum 22 which is suitably secured to the crank shaft of the compressor. The clutching shoes of the centrifugal clutch are adapted to swing outwardly and establish clutching engagement with the inner surface of this clutch drum 22, as will be later described.

Figure 3:
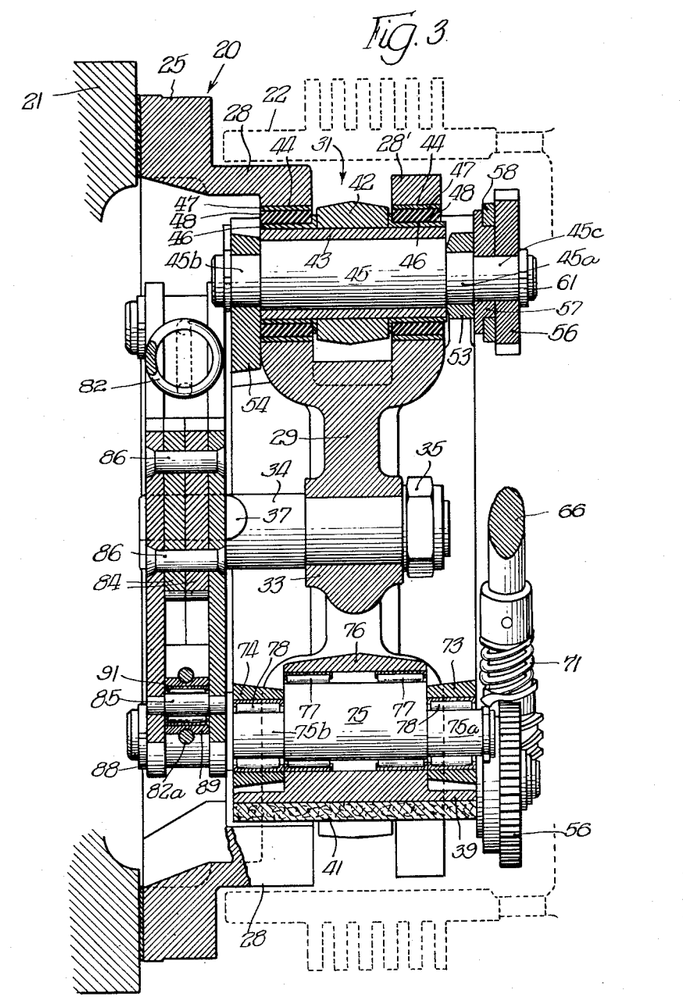
Figure 3 is a transverse sectional view taken approximately on the section planes 3—3 of Figures 1 and 2, the adjacent centrifugally responsive pivoted weight being shown in section.
Figure 4:
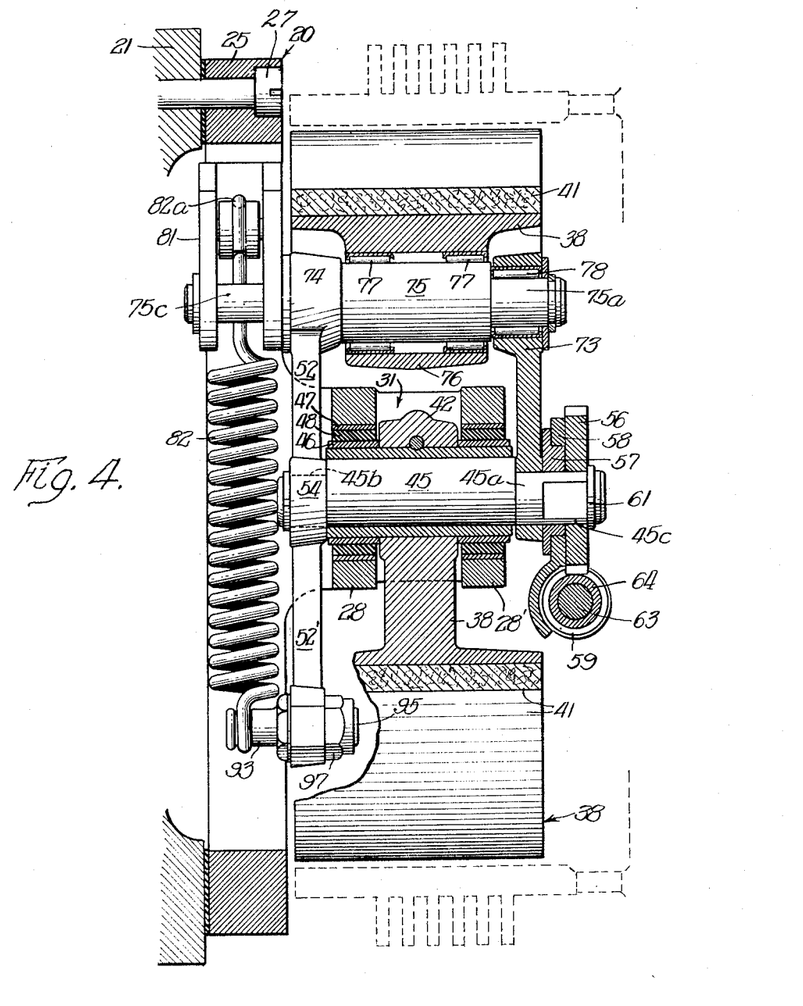
Figure 4 is a transverse sectional view taken approximately on the section planes 4—4 of Figures 1 and 2.

The driving ring 20 comprises an annular bolting flange 25 having holes 26 therein for receiving bolts or cap screws 27 which fasten the flange 25 to the fly wheel 21. This driving ring 20 is preferably a casting, and at two diametrically opposite points it is formed with laterally projecting arm portions 28 which are joined by a diametrically extending bar portion 29 formed as an integral part of the arms 28 and bolting flange 25. Spaced outwardly from each arm portion 28 is another arm portion 28' formed integral therewith and with the cross bar portion 29, these two arm portions 28, 28' constituting the two side arms of a yoke defining a pivot opening 31 therebetween. There are two of these yoke formations at diametrically opposite points of the driving ring, and these yokes afford pivotal support for the pivotally anchored ends of the arcuate clutch shoes. As shown in Figure 3, the transverse bar portion 29 is formed with an apertured boss 33 at its center in which is clamped a shouldered pin 34 held in place by a nut 35 screwing over a threaded end of the pin. The other end of said pin is formed with splayed flat surfaces 37 at diametrically opposite sides, these surfaces 37 functioning as stop surfaces for limiting the inward swinging movement of the pivoted centrifugal weights, as will be presently described.

Figure 2:
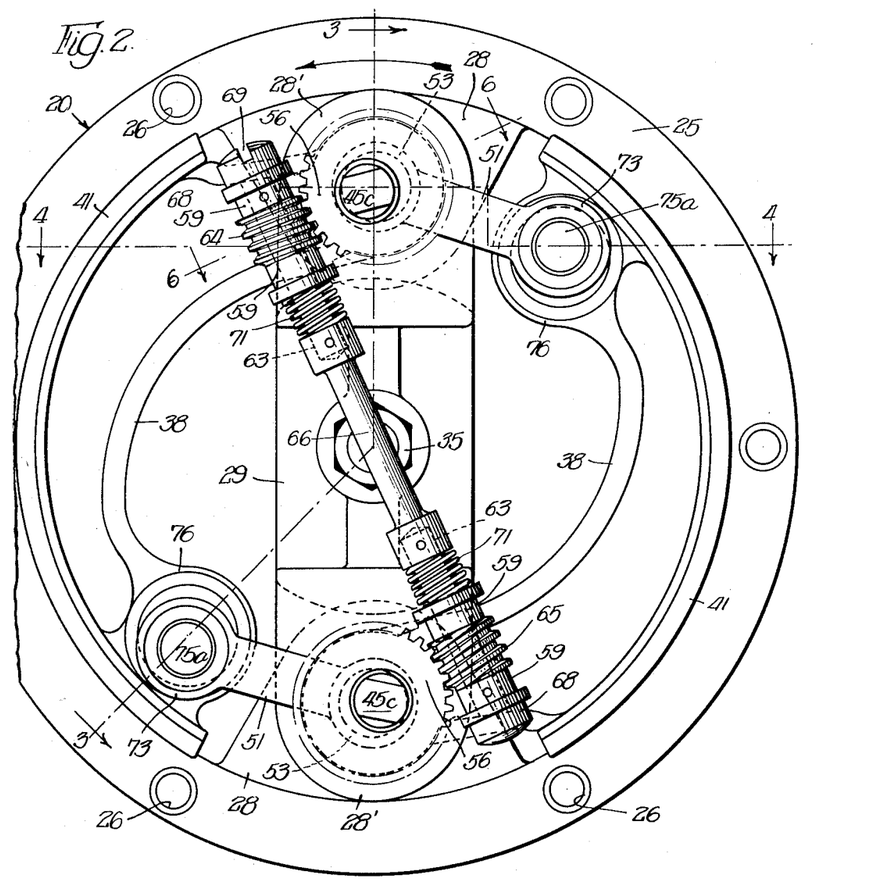
Figure 2 is a similar view of this same embodiment as viewed from the opposite side.

Referring now to the arcuate clutch shoes and their mounting in the yoke arms 28, 28', it will be seen from Figure 2 that there are two of these arcuate clutch shoes, designated 38, preferably composed of castings of duplicate form. As shown at the bottom of Figure 3, each clutch shoe is formed with a laterally projecting outer flange 39 to which any suitable clutch facing material 41 is secured by rivets or in any other suitable manner. The exterior curvature of these clutch shoes corresponds substantially with the internal radius of the clutch drum 22. The pivotally anchored end of each clutch shoe is formed with a pivot eye 42 which extends into the yoke opening 31 and which is pivotally supported upon a pivot thimble or sleeve 43 extending through pivot openings 44 in the yoke arms 28, 28'. Mounted with a snug rotative fit within each bearing thimble 43 is an adjustable bearing pin 45 which pivotally supports the link connections extending to the swinging end of each clutch shoe, as I shall presently describe. Attention is now directed to the aforementioned free floating mounting of the clutch shoes and clutch actuating parts on the driving clutch ring 20. This free floating mounting is obtained by a yieldable bushing mounting of the bearing sleeve 43 and bearing shaft 45 within the bearing openings 44. As shown in the upper part of Figure 3, this arrangement comprises pairs of yieldable bushings each consisting of an inner metallic ring 46, an outer metallic ring 47 and an intervening resilient ring 48 of rubber, neoprene, or other deformable plastic material suitable to this purpose. The intervening resilient ring 48 may be vulcanized or otherwise secured to the adjacent surfaces of the metallic rings, if desired. This resilient material is preferably prestressed or precompressed in its introduction between the metallic rings. The inner metallic ring 46 has a snug fit over the end of the bearing thimble 43 and the outer metallic ring 47 has a snug fit within the pivot aperture 44. It will be noted that this free floating mounting is effective both for the bearing sleeve 43 and also for the bearing shaft 45 within this sleeve. Thus, the yieldable bushing affords a free floating mounting for the pivotally anchored end of each clutch shoe, and also a free floating mounting for the link connected end of each clutch shoe, as will hereinafter appear. This free floating mounting of both ends of each clutch shoe 38 enables the two clutch shoes to effect aligning adjustments with respect to the axis of the fly wheel 21 and with respect to the axis of the driven clutch drum 22. That is to say, it enables the two clutch shoes to automatically center themselves with respect to the inner cylindrical clutching surface of the driven clutch drum 22, while still receiving the entire driving torque from the driving clutch ring 20 which may be revolving in a different orbit. Hence, the clutch structure can adapt itself to a considerable degree of angular misalignment and also offset misalignment between the driving element 21 and driven element 22. Also, as will later appear, the reaction pressure of clutching engagement is transmitted directly from shoe to shoe, and not to the driving ring 20.

Referring now to the manner of link connecting the outwardly swinging ends of the two clutch shoes 38, 38 to the two adjustable bearing pins 45, this comprises an outer link 51 and an inner link 52, this inner link constituting one arm of a two-armed supporting member 52' which carries the centrifugal weight and retracting spring, as will be later described. Each outer link 51 (Figure 2) has a pivot eye 53 at its inner end which engages over a reduced extension 45a projecting outwardly from the shaft 45, and each inner link 52 is formed with a pivot eye 54 which engages over a corresponding extension 45b projecting inwardly from the other end of the shaft 45. These oppositely projecting extensions 45a and 45b are both formed as eccentric cranks, both aligned with each other so as to have the same degree of eccentricity with respect to the axis of the pin 45. Hence, it will be seen that rotation of the shaft 45 within the bearing thimble 43 will impart identical degrees of eccentric throw to the eccentric extensions 45a and 45b for giving identical degrees of inward and outward adjustment to the links 51 and 52. This eccentric adjustment transmitted to the brake shoes through the links 51 and 52 is primarily a wear adjustment to take up wear in the outer friction surfaces of the clutch facings 41.

Referring now to one form of manual adjusting mechanism for simultaneously adjusting the eccentrics 45a and 45b for the two clutch shoes, it will be seen from Figure 3 that a shaft extension 45c projects outwardly from the eccentric portion 45a and has a sector gear 56 keyed or splined thereto transmitting rotative movement to the shaft 45. Mounted loosely on the shaft extension 45c inside of the sector gear 56 is a ring 57 to which is secured a small stamping or casting 58 in the form of a bearing hanger which is formed with two spaced bearings 59, 59 (Figure 2). A retainer washer 61 or like retainer member holds the sector gear 56 and ring 57 from displacement off the outer end of the shaft extension 45c. It will be understood that the above described construction is duplicated on the eccentric shaft 45 which mounts the other clutch shoe at the other side of the assembly. Rotatably mounted in the spaced bearing hubs 59 at each side of the assembly is a stub shaft 63. Pinned to these stub shafts between the pairs of bearings 59 are adjusting worms 64 and 65, one having a right hand thread and the other a left hand thread, these threads meshing with the teeth of the opposite sector gears 56. The inner ends of the two stub shafts 63 are coupled together by a coupling stem 66 which is pinned to both shafts. The aligned assembly of stub shafts, adjusting worms and coupling stem is arranged to extend diametrically across the center line of the assembly to engage opposite peripheral sides of their respective sector gears 56, so that the assembly is statically and dynamically balanced. The stub shafts 63 are provided with outer heads 68, and one or both of these heads is provided with a screw driver slot 69. Adjustment for wear can therefore be easily effected by inserting a screw driver in the slot 69 and rotating the two adjusting worms 64 and 65 in the appropriate direction for causing the eccentric shafts 45 to be adjusted for thrusting the links 51 and 52 in an outward direction for carrying the inwardly movable ends of the clutch shoes 38 into closer proximity to the inner surface of the driven drum 22. Compression springs 71 confined between the outer ends of the coupling stem 66 and the adjacent bearings 59 function as friction lock washers to hold the adjusting worms 64 and 65 against accidental turning after an adjustment has been made. The clutch assembly rotates in a counter-clockwise direction, as viewed in Figure 2, and hence it will be seen that these inwardly movable ends of the clutch shoes are the leading ends.

Figure 1:
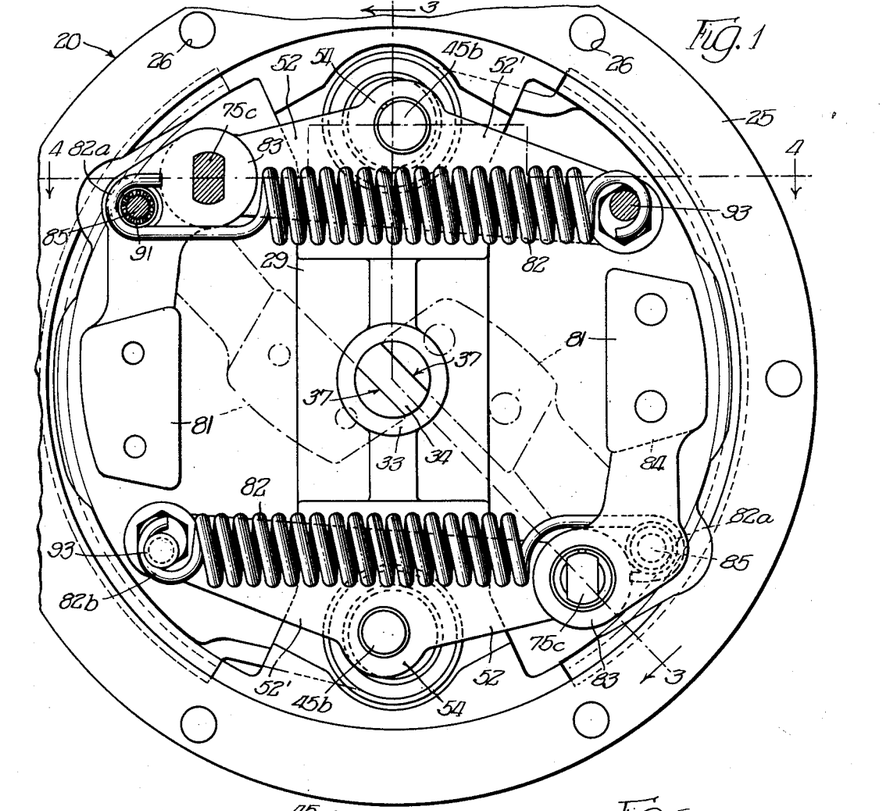
Figure 1 is an axial or front view of one embodiment of the invention, with parts broken away.
Figure 5:
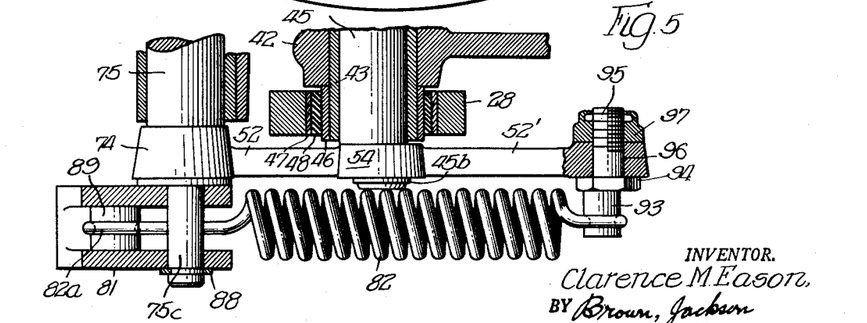
Figure 5 is a detail sectional view showing the adjustable mounting of each retracting spring and its connection with its respective centrifugally responsive weight.
Figure 6:
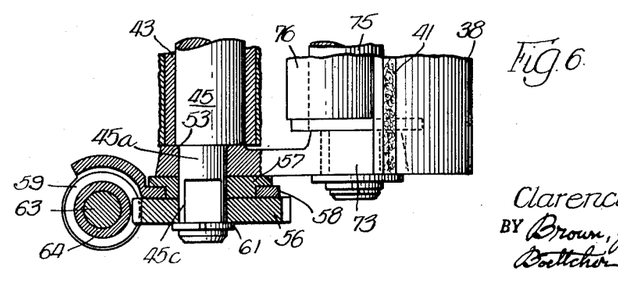
Figure 6 is a detail sectional view of the adjusting mechanism, taken approximately on the plane of the line 6—6 of Figure 2.

Referring now to the automatic centrifugal mechanism which governs the automatic engaging and releasing of the clutch, the outer ends of the pressure links 51 and 52 are formed with pivot eyes 73 and 74 (Figure 3) which have operative connection with the actuatable ends of their respective clutch shoes through eccentric shafts 75 which are quite similar to the eccentric shafts 45 which mount the anchored ends of the clutch shoes. As shown in the lower portion of Figure 3, each shaft 75 is rotatably mounted in the pivot eye 76 of the clutch shoe, with anti-friction pin or needle bearings 77 interposed between the shaft 75 and the pivot eye 76. Eccentric extensions 75a and 75b project in alignment from opposite ends of the shaft 75 and have rotatable mounting in the pivot eyes 73 and 74 of the pressure links. Anti-friction pin bearings 78 are also preferably interposed between these eccentric extensions and the pivot eyes of the pressure links. Projecting inwardly from the inner extension portion 75b is a further shaft extension 75c to which the torque forces are applied which govern the automatic operation of the clutch. These forces are created by centrifugally responsive weighted levers 81 which are mounted on the shaft extensions 75c and which have their outward swinging movements opposed by resistance springs 82. As shown in Figure 1, these weighted levers or arms 81 are preferably of angular formation, as viewed from the side, each of these levers comprising a mounting eye 83 at one end, a series of weights 84 at the other end, and an intermediate pin 85 therebetween to which the tension spring 82 is connected. As shown in Figure 3, each of these centrifugal levers is made up of two similar stampings held in spaced relation by interposing the weights 84 between the outer portions of the stampings, the weights and lever stampings being secured together by the transverse rivets 86. The mounting eyes 83 have polygonal openings therein which engage splayed surfaces on the shaft extensions 75c, whereby these weighted levers are secured fast to the eccentric shafts 75. Any suitable retainer ring 88 engages over the shaft extension and prevents outward displacement of the weighted lever therefrom. The transverse pin 85 which is provided for establishing connection with the tension spring 82 carries a roller or sleeve 89, with an anti-friction pin bearing 91 interposed between the connecting pin 85 and the sleeve 89. The tension spring 82 has a hooked end 82a which engages in an external groove in the sleeve 89. The opposite end of the tension spring is also formed with a hook portion 82b which hooks over an adjustable anchor stud 93 carried at the outer end of arm 52'. Referring to Figure 5, this anchoring stud 93 is of adjustable eccentric construction for enabling the tension of the spring 82 to be readily adjusted. The stud 93 projects eccentrically from the hexagon head 94 of a threaded shank 95 which extends through an aperture 96 in arm 52' and receives a lock nut 97 over its threaded end. By releasing the lock nut 97 this threaded shank can be rotated so as to shift the anchoring stud 93 either inwardly or outwardly and thereby decrease or increase the tension of the spring 82.

Figure 7:
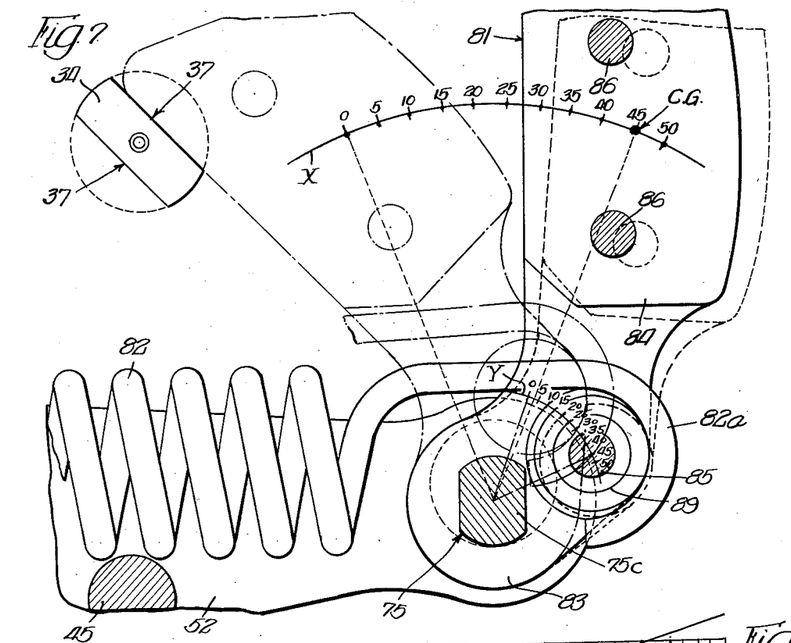
Figure 7 is a diagrammatic view of the operating relationship of the pivoted centrifugal weight and the retracting spring in the above embodiment, showing the angular positions of the centrifugal weight and the corresponding angular positions of the lever arm which connects with the associated retracting spring.
Figure 8:
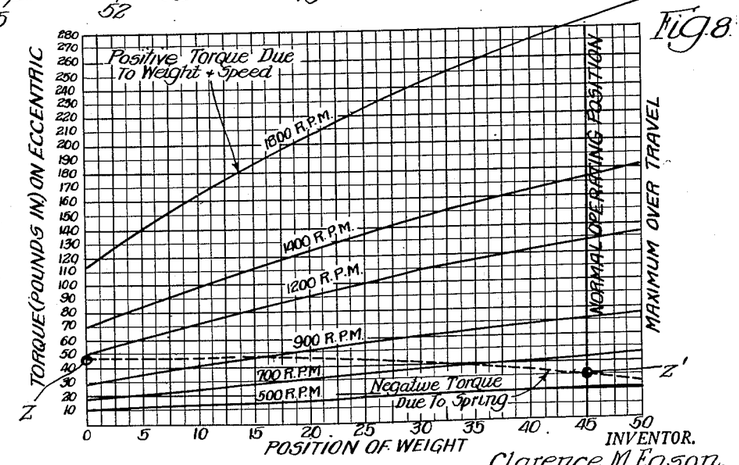
Figure 8 is a graph showing the variations of clutch engaging torque on each clutch actuating eccentric for the different angular positions of the pivoted centrifugal weight at different engine speeds, and also showing the opposing spring pressures exerted by the retracting spring in the different angular positions of the pivoted centrifugal weight.

The operation of the clutch will be best understood by referring now to the large scale diagram of Figure 7 and the plotted curves of Figure 8. When the engine is standing idle, and also when it is running at relatively low non-clutching speeds, the tension springs 82 hold the two centrifugal levers 81 at the inner limits of their swinging movement, with the inner edges of said levers abutting against the stop surfaces 37 of the central stop pin 34. When the engine is set into operation and has its speed increased up toward the automatic clutching point, it will be seen that centrifugal forces acting in the centrifugal levers 81 will tend to swing these levers outwardly around the axes of the actuating eccentrics 75. Centrifugal forces are also acting at this time within the clutch shoes 38 themselves, tending to swing the clutch shoes outwardly, but consideration will be confined for the time being to the centrifugal forces acting in the weighted levers 81. It will be assumed that the center of gravity or centrifugal mass C. G. of each weighted lever, falls at a point between the rivets 86, and that this center of gravity of the lever moves along the arc indicated by dotted line X as the weighted lever swings around the axis of the actuating eccentric 75. Each weighted lever has a range of throw of approximately 50 degrees, and I have marked off on this arc X the different positions of this center of gravity as that point moves through each five degrees of swinging movement. The position marked 45 degrees represents the normal clutch-engaged running position of the center of gravity, and the position marked 50 degrees represents a range of overtravel to provide for wear of the clutch surfaces. Referring now to the motion of the spring connecting pin 85, the axis of this pin swings through an arc denoted by the dotted line Y. Correspondingly, I have marked off five degree positions on this arc Y showing the different positions of the pin axis 85 as the center of gravity of the weighted lever moves outwardly through each five degrees along the arc X. It will be noted that as the center of gravity C. G. of the weighted lever moves outwardly along the arc X, its radial distance from the rotative axis of the entire clutch assembly increases, whereby it revolves in successively larger orbits around the clutch axis. This means that the angular velocity of the weighted lever around the clutch axis increases, and, of course, the centrifugal force in the weighted lever also increases. It will also be noted that the center of gravity C. G. of the weighted lever has a relatively short length of effective radius arm or moment arm around the pivot axis of the lever when the lever is in its inwardly retracted position, and that this effective radius arm increases continuously as the center of gravity swings outwardly toward and into the 45 degree position. Hence, the centrifugal force of the weighted lever first tends to exert a relatively small torque or moment arm on the actuating eccentric 75, and as the engine speed increases and the weighted lever starts to swing outwardly, this torque or moment arm tends to act with increasing effectiveness on the actuating eccentric 75. Rotation of this eccentric in a clockwise direction (Figure 1) with the outward swinging of weighted arm 81 acts to force the pivot eye 76 of the clutch shoe in an outward direction for causing engagement of the clutch. Now let us consider what is taking place along the arc Y as the axis of the connecting pin 85 swings through a corresponding range of movement. When the weighted lever is in its inwardly retracted position, the axis of this spring connecting pin 85 has a relatively long length of effective radius arm or moment arm around the pivot of the weighted lever; but as the lever swings outwardly in response to centrifugal force the effective length of this radius arm continuously diminishes until the radius arm has a much shorter length when the spring connecting pin is in the 45 degree position shown in Figure 7. It will hence be seen that the tension of the spring 82 is transmitted to the weighted lever or to the axis of the actuating eccentric through a continuously diminishing radius arm as the weighted lever swings outwardly in response to increasing engine speed. Preferably, the proportions of this diminishing ratio of effective lever arm compared to the length or deflection change of the tension spring are such that the resistance offered by the spring to continued outward swinging movement of the weighted lever diminishes even though the tension of the spring builds up with increased elongation. Thus, it will be seen that as soon as the centrifugal force acting along arc X is large enough to overcome the resistance force acting along the arc Y, the resulting outward movement of the pivoted lever is quite rapid, because the resistance force continuously decreases at the same time that the centrifugal force along arc X continuously increases. This results in a relatively quick engagement of the clutch after the prime mover has reached the predetermined clutching speed. As previously described, the clutching engagement is brought about by the turning movement of the actuating eccentric 75 which sets up a separating pressure between the eyes 73 and 74 of the pressure links and the eye 76 of the clutch shoe, whereby this end of the clutch shoe is forced outwardly into clutching engagement against the inner surface of the driven drum 22. It will be seen from the foregoing that as the engine speed is increased for the purpose of engaging the clutch, the centrifugally responsive weighted arm 81 assumes dominance over the opposing spring 82 at a substantially predetermined speed or range of speeds which I shall call the approximate clutch engaging speed, at which point the clutch snaps into engagement, because of the above described inverse relationship between the increasing radius arm through which the weighted lever acts and the decreasing radius arm through which the opposing spring acts.

Referring now to the reverse operation of automatically releasing the clutch, when the engine speed is reduced to the point where the centrifugal force acting on the weighted levers 81 is not sufficient to overcome the tension pull of the springs 82, then the springs quickly assume dominance over the weighted levers with the result that the levers start to swing inwardly into a clutch releasing position. In this inward swinging movement the radius arm of the center of gravity C. G. continuously diminishes in effective length, whereas the radius arm of the spring connecting pin 85 continuously increases in effective length. Hence, it will be seen that when the clutch shoes start to release, they release very quickly, thereby minimizing heating and wear of the clutch surfaces.

Figure 8 shows a typical set of performance curves obtained in the operation of one of my improved clutches. The full-line upwardly extending curves indicate the torque in inch-pounds exerted on the actuating eccentric 75 by the weighted lever at different engine speeds and different angular positions of the weighted lever. The downwardly extending dotted line curve denotes the negative or opposing torque in inch-pounds which is exerted through connecting pin 85 upon the actuating eccentric 75 by the resistance spring 82. This latter curve slopes downwardly by reason of the continuously diminishing length of effective radius arm Y (Figure 7) as the weighted lever swings outwardly toward the clutch engaging position. The point Z at the left hand end of the negative torque curve indicates the minimum "break-away" speed at which clutch engagement will be initiated, and the point Z' at the 45 degree position on this negative torque curve indicates the approximate speed at which clutch release will occur. It will be seen that a speed of approximately 1200 R. P. M. or higher is necessary to overcome the negative torque of the spring and the static friction of the parts when the weighted lever is in the zero degree position. Similarly, it will be seen from the point Z' that the engine speed must be brought down to approximately 600 R. P. M. before the positive torque exerted centrifugally by the weighted lever is equal to or less than the negative spring torque which will start disengagement. Thus, in this example, the ratio of clutch engaging speed to clutch releasing speed is approximately in the relation of 2 to 1. Other ratios can be obtained by proper proportioning of the parts. Similarly, the speed level of clutch engagement and of clutch release can be raised or lowered by increasing or decreasing the tension of the opposing springs 82, as by adjustment of the eccentric anchoring studs 93.

It will be seen from the foregoing description that the rubber bushed mounting 46, 47, 48 provides for the automatic centering of the clutch shoes 38 within the driven clutch drum 22 in the event of angular or offset misalignment of the driving and driven clutch elements. It also provides for the reaction pressure of clutching engagement being transmitted directly from shoe to shoe with the only supporting connection between the shoes and the driving ring 20 a resilient connection through the rubber bushings 46, 47, 48. These rubber bushings also afford a free floating mounting for the pivoted centrifugal weights 81 and the retracting springs 82, whereby these weights and springs become a part of the floating assembly which includes the clutch shoes. Incidentally, any adjustments for wear effected by rotation of the adjusting eccentrics 45 do not vary the tension of the retracting springs 82 because the spring supporting arms 52' and anchor studs 93 move bodily with the rest of the assembly in such adjustments. Operation of clutches of this type has demonstrated the ability of the parts to perform their intended functions even without the presence of the rubber 48. For example, in one instance of a clutch operating under conditions of extremely abnormal misalignment the rubber was actually burned out of the yielding bushings 46, 47 and 48, but the clutch continued to function satisfactorily except that there was some objectionable noise or clatter of the parts.

While I have illustrated and described what I regard to be the preferred embodiment of my invention, nevertheless it will be understood that such is merely exemplary and that numerous modifications and rearrangements may be made therein without departing from the essence of the invention.

I claim:

1. In a centrifugal clutch, the combination of a driving clutch element, a driven clutch drum, arcuate clutch shoes having anchored ends pivotally carried by said driving element and having swinging ends adapted to swing outwardly into clutching engagement with the interior of said drum, resilient mounting means between said driving clutch element and the anchored ends of said clutch shoes for permitting a limited degree of floating movement of said anchored ends relatively to said driving clutch element adjusting eccentrics carried by said driving element for pivotally supporting the anchored ends of said clutch shoes, links pivotally supported on said adjusting eccentrics, actuating eccentrics connecting said links with the swinging ends of said clutch shoes whereby the clutch engaging pressure is transmitted from the swinging end of each shoe to the pivoted end of the opposite shoe by virtue of the limited degree of floating movement of the pivotally anchored end permitted by said resilient mounting means, adjusting means for rotating said adjusting eccentrics, centrifugally responsive clutch engaging levers operatively connected with said actuating eccentrics, and opposing springs connected to oppose clutch engaging motion of said levers.

2. In a clutch, the combination of a driving clutch element, a driven clutch drum, arcuate clutch shoes driven by said driving element and adapted to effect clutching engagement with said drum, adjusting eccentrics pivotally mounting the pivoted ends of said clutch shoes on said driving clutch element, means operable from the periphery of the clutch for rotating said adjusting eccentrics to adjust the positions of said shoes, actuating eccentrics mounted on separate centers from said adjusting eccentrics and operatively connected to swing the swinging ends of said shoes outwardly, and centrifugal weights acting on said actuating eccentrics.

3. In a clutch, the combination of a driving clutch element, a driven clutch drum, arcuate clutch shoes driven by said driving element and adapted to effect clutching engagement with said drum, adjusting eccentrics pivotally mounting said clutch shoes on said driving clutch element, worm and gear means for rotating said adjusting eccentrics to adjust said shoes for wear, links for connection with outwardly movable ends of said shoes, actuating eccentrics connected with said links, said actuating eccentrics being disposed on separate centers from said adjusting eccentrics, and centrifugally responsive means for automatically rotating said actuating eccentrics to engage said clutch.

4. In a clutch, the combination of a driving clutch element, a driven clutch drum, arcuate clutch shoes driven by said driving element and adapted to effect clutching engagement with said drum, adjusting eccentrics pivotally mounting said clutch shoes on said driving clutch element, links pivotally mounted on said adjusting eccentrics, actuating eccentrics pivotally connecting the outwardly swinging ends of said links with the outwardly swinging ends of said clutch shoes, pivotally swinging centrifugal weights connected with said actuating eccentrics and operative to turn said latter eccentrics for automatically engaging said clutch at a substantially predetermined range of speeds, retracting springs connected at one end with said centrifugal weights, adjustable anchor means for adjustably attaching the other ends of said springs to said links whereby the tension of said springs may be varied, and worm and worm wheel means operatively connected with said adjusting eccentrics for simultaneously adjusting said latter eccentrics to take up wear of the clutch shoes, said anchor means for said retracting springs moving with the adjustments effected by said adjusting eccentrics whereby said latter adjustments do not vary the tension of said springs.

5. In an automatic centrifugal clutch, the combination of a driving clutch ring, a driven clutch drum, centrifugally responsive arcuate clutch shoes adapted to swing outwardly into clutching engagement with the interior of said driven clutch drum, each of said shoes having a pivotally anchored end and an outwardly swinging end, mounting pivot means carried by said driving clutch ring, adjusting eccentrics carried by said mounting pivot means and on which the anchored ends of said clutch shoes are pivoted, connecting links having pivotally anchored ends and inwardly swinging ends, the pivotally anchored ends of said links having pivotal mounting on said adjusting eccentrics, actuating eccentrics serving as the pivoting instrumentalities between the inwardly swinging ends of said links and the outwardly swinging ends of the corresponding clutch shoes, centrifugally responsive weighted levers carried by said actuating eccentrics for actuating the latter in a clutch engaging direction at relatively high speeds, retracting tension springs connected with said weighted levers through lever arms which decrease in effective length as said weighted levers swing outwardly in response to higher speeds, the parts being so constructed and proportioned that in such outward swinging movement of said weighted levers the rate at which the effective length of said lever arm decreases is considerably faster than the rate at which the tension in said retracting spring increases with increased deflection, whereby clutch engagement is caused to occur very suddenly at a relatively high speed closely approaching maximum speed, and whereby clutch release is caused to occur very suddenly at a relatively low speed considerably below that of clutch engaging speed, and adjusting means accessible from the periphery of said clutch and having geared connection with said adjusting eccentrics for adjusting said clutch shoes.

6. In an automatic centrifugal clutch, the combination of a driving clutch ring, a driven clutch drum, centrifugally responsive arcuate clutch shoes adapted to swing outwardly into clutching engagement with the interior of said driven clutch drum, each of said clutch shoes having a pivotally anchored end and an outwardly swinging end, the direction of rotation of the clutch being such that the outwardly swinging end of each shoe is the leading end of the shoe, pivot eyes carried by said driving clutch ring, adjusting eccentrics mounted therein, resilient bushings interposed between said pivot eyes and said adjusting eccentrics to accommodate misalignment, said clutch shoes having their anchored ends pivotally mounted on said adjusting eccentrics, connecting links having pivotally anchored ends and inwardly swinging ends, the pivotally anchored ends of said links having pivotal mounting on said adjusting eccentrics, actuating eccentrics pivotally interposed between the inwardly swinging ends of said links and the outwardly swinging ends of the corresponding clutch shoes, centrifugally responsive weighted levers carried by said actuating eccentrics for actuating the latter in a clutch engaging direction in response to higher speeds, retracting springs connected with said weighted levers each through a radius arm which decreases in effective length as the weighted lever swings outwardly in response to higher speeds, the parts being so constructed and arranged that in such outward swinging movement of the weighted lever the rate at which the effective length of said radius arm falls off is substantially faster than the rate at which the tension in the spring builds up with increasing deflection, whereby clutch engagement is caused to occur very suddenly at a relatively high speed of said driving element, and whereby clutch release is caused to occur very suddenly at a relatively low speed of approximately one-half that of clutch engaging speed, and worm and gear means for rotating said adjusting eccentrics to adjust said shoes for wear.

7. In an automatic centrifugal clutch, the combination of a driving clutch ring, a driven clutch drum, arcuate clutch shoes adapted to swing outwardly into clutching engagement with the interior of said driven clutch drum, each of said clutch shoes having a pivotally anchored end and an outwardly swinging end, means pivotally mounting the anchored end of each clutch shoe on said driving clutch ring, connecting links having pivotally anchored ends and inwardly swinging ends, the pivotally anchored ends of said links having pivotal mounting on said driving clutch ring, actuating eccentrics disposed as the pivoting instrumentalities between the inwardly swinging ends of said links and the outwardly swinging ends of the corresponding clutch shoes, said actuating eccentrics functioning to exert a separating force between the shoes and the links tending to thrust the swinging ends of the shoes outwardly and tending to exert an inwardly thrusting reactive force on said links, centrifugally responsive weighted levers connected with said actuating eccentrics and adapted to rotate the latter for creating said separating force as said weighted levers swing outwardly in response to higher speeds, opposing spring means connected to act on said weighted levers in a clutch releasing direction, one end of each opposing spring means being operatively connected with its associated weighted lever, and means for operatively connecting the other end of each opposing spring means with a reaction point on one of said connecting links.

8. In an automatic centrifugal clutch, the combination of a driving clutch ring, a driven clutch drum, arcuate clutch shoes adapted to swing outwardly into clutching engagement with the interior of said driven clutch drum, each of said shoes having a pivotally anchored end and an outwardly swinging end, mounting pivot means carried by said driving clutch ring, adjusting eccentrics carried by said mounting pivot means and on which the anchored ends of said clutch shoes are pivoted, connecting links having pivotally anchored ends and inwardly swinging ends, the pivotally anchored ends of said links having pivotal mounting on said adjusting eccentrics at one side of the assembly, two-arm members pivotally supported intermediate their ends on said actuating eccentrics on the other side of the assembly and having one arm extending substantially parallel with the associated connecting link, actuating eccentrics disposed as the pivoting instrumentalities between the outwardly swinging ends of the clutch shoes and the inwardly swinging ends of said connecting links and the adjacent arms of said two-arm members, centrifugally responsive weighted levers carried by said actuating eccentrics for actuating the latter in a clutch engaging direction at a relatively high speed, retracting tension springs each connected with one of said weighted levers through a lever arm which decreases in effective length as said weighted lever swings outwardly in response to higher speeds, and means for securing the other end of each tension spring to the other arm of the associated two-arm member whereby said spring moves with said two-arm member in pivoting or adjusting movement of the latter.

9. In an automatic centrifugal clutch, the combination of a driving clutch ring, a driven clutch drum, centrifugally responsive arcuate clutch shoes adapted to swing outwardly into clutching engagement with the interior of said driven clutch drum, mounting pivot means carried by said driving clutch ring, adjusting eccentrics carried by said mounting pivot means, each of said shoes having a pivotally anchored end and an outwardly swinging end, said pivotally anchored ends being mounted on said adjusting eccentrics, connecting links having pivotally anchored ends and inwardly swinging ends, the pivotally anchored ends of said links having pivotal mounting on said adjusting eccentrics, actuating eccentrics serving as the pivoting instrumentalities between the inwardly swinging ends of said links and the outwardly swinging ends of the corresponding clutch shoes, said actuating eccentrics functioning to exert a separating force tending to thrust the swinging end of the shoe outwardly and tending to exert an inwardly thrusting reaction force on said links, centrifugally responsive weighted levers carried by said actuating eccentrics, retracting tension springs connected with said weighted levers through lever arms which decrease in effective length as said weighted levers swing outwardly in response to higher speeds, the parts being so constructed and proportioned that in such outward swinging movement of said weighted levers the rate at which the effective length of said lever arm decreases is considerably faster than the rate at which the tension in said retracting spring increases with increased deflection, whereby clutch engagement is caused to occur very suddenly at a relatively high speed closely approaching maximum speed, and whereby clutch release is caused to occur very suddenly at a relatively low speed considerably below that of clutch engaging speed, an adjusting shaft carried by said driving clutch ring and extending substantially diammetrically of the clutch across one side thereof, worms mounted on the end portions of said shaft, and worm wheels meshing with said worms and mounted on said adjusting eccentrics whereby rotation of said shaft is operative to angularly adjust said adjusting eccentrics through said worms and worm wheels.

CLARENCE M. EASON.

REFERENCES CITED

The following references are of record in the file of this patent:

UNITED STATES PATENTS

| Number | Name | Date |
|---|---|---|
| 675,425 | Sturtevant | June 4, 1901 |
| 1,692,703 | Rigolage | Nov. 20, 1928 |
| 1,853,908 | Lake | Apr. 12, 1932 |
| 1,865,772 | Lyman | July 5, 1932 |
| 1,869,097 | Fawick | July 26, 1932 |
| 1,917,501 | Cotterman | July 11, 1933 |
| 1,939,601 | Spalding | Dec. 12, 1933 |
| 2,005,350 | Rickwood | June 18, 1935 |
| 2,168,856 | Banker | Aug. 8, 1939 |
| 2,263,153 | Wilson | Nov. 8, 1941 |
| 2,375,909 | Fawick | May 15, 1945 |
| 2,392,950 | Russell | Jan. 15, 1946 |
| 2,419,784 | Low | Apr. 29, 1947 |